United States Patent [19]

Light

[11] 3,906,190

[45] Sept. 16, 1975

[54] APPARATUS FOR INTEGRATION AND AVERAGING

[75] Inventor: Leon Henry Light, London, England

[73] Assignee: National Research Development Corporation, London, England

[22] Filed: June 27, 1973

[21] Appl. No.: 374,066

[30] Foreign Application Priority Data

June 30, 1972 United Kingdom............... 30790/72

[52] U.S. Cl........ 235/61.6 A; 235/61.11 C; 200/46; 178/18; 340/173 R

[51] Int. Cl.$^2$ ............... G06K 11/02; G08C 21/00; H01H 43/08; G11C 11/44

[58] Field of Search... 235/61.6 A, 61.6 B, 61.12 C, 235/61.11 A, 61.12 R, 61.11 C; 340/146.3 SY, 173 R; 200/46; 178/18

[56] References Cited

UNITED STATES PATENTS

| | | | |
|---|---|---|---|
| 2,171,556 | 9/1939 | Higginbottom | 235/61.12 C |
| 2,876,562 | 3/1959 | Stieber | 235/61.6 A |
| 2,889,626 | 6/1959 | Neou | 235/61.6 A |
| 2,902,607 | 9/1959 | Hedger | 235/61.6 A |
| 3,470,359 | 9/1969 | Esterly | 235/61.11 A |
| 3,500,020 | 3/1970 | Cone | 235/61.6 A |
| 3,576,407 | 4/1971 | Stephens | 200/46 |
| 3,624,619 | 11/1971 | Ambrosio | 340/173 R |
| 3,652,842 | 3/1972 | Lewin | 235/61.6 A |
| 3,671,716 | 6/1972 | Slutsky | 235/61.6 A |
| 3,694,743 | 9/1972 | Dalke | 235/61.6 B |

*Primary Examiner*—Daryl W. Cook
*Assistant Examiner*—Robert M. Kilgore
*Attorney, Agent, or Firm*—Cushman, Darby & Cushman

[57] ABSTRACT

An integrator and averager for use with graphs or recorder charts is described. In use the graph is placed on a tablet and a stylus is used to follow the curve. The tablet has an upper conductive sheet and a lower layer which may be a series of parallel conductors or a condutive layer. Voltage is normally applied across the lower layer in the direction of the independent variable and sensed from the upper sheet. An increment detector causes voltage to be applied across the lower layer instead, for a predetermined interval, in the direction of the dependent layer, each time an increment of the independent variable is detected. An integrator is charged during the intervals and its output is indicative of the area under the graph. By automatically dividing the interval of the independent variable over which the graph was traced, the average value is obtained.

21 Claims, 8 Drawing Figures

APPARATUS FOR INTEGRATION AND AVERAGING

Figure 1:
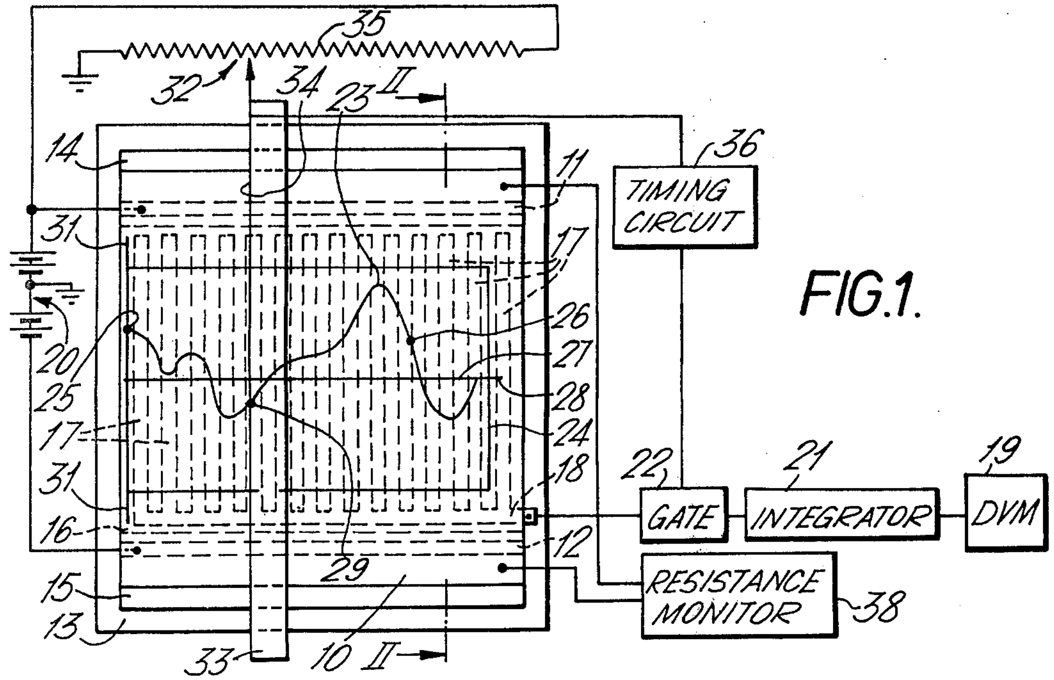

The present invention relates to apparatus for use in integrating from a graph of a function and in determining the average value of the function in a given interval.

A problem which arises in many branches of science and technology is that of integrating the area under a curve showing an experimental result, and that of finding the average value of a variable from a recording.

One form of existing apparatus has a stylus, which is linked mechanically to potentiometers and is moved over the outline of the curve, and another employs expensive servo-systems to avoid the need for mechanical linkage.

According to a first aspect of the present invention there is provided apparatus for use in determining the integral or average value of a function from a graph thereof, including an area on which, in operation, a graph of a function is placed, means for sensing the position of stylus means used to follow the curve of the graph, by generating electrical signals due to electrical interaction between the stylus means and a portion or portions, adjacent to the point of the curve currently being followed, of a member or members adjacent to the area, and means for providing, from the output signals of the position sensing means, signals representative of the integral or average value of that part of a graph on the area which is, in operation, traced out using the stylus.

According to a second aspect of the present invention there is provided apparatus for use in determining the integral or average value of a function from a graph thereof, including an area in which, in operation, a graph of a function is placed, means for sensing the position of stylus means used to follow the curve of the graph, by generating electrical signals due to the position of the stylus means in relation to a portion or portions, adjacent to the point of the curve currently being followed, of a member or members adjacent to the area, sampling means for providing from the output signals of the position sensing means signals representative of the stylus means position measured in a first direction in the said area and taken at equal intervals in a second direction, orthogonal to the first, in the area, and integrating means for summing the signals from the sampling means, the apparatus being such that if a graph is placed on the said area with the axis of the dependent variable parallel to the first direction, then the signals from the sampling means to the integrating means are representative of samples of the dependent variable taken at equal intervals of the independent variable.

Advantageously there are two members on one side of and extending parallel to the said area, and the position-sensing means functions by determining resistance or capacitance effects between the members as the stylus means follows the curve, the stylus means, in operation, not necessarily making contact with the representation of the graph.

Instead there may be a single member, extending parallel to the area, in the form of a sheet exhibiting the piezo electric effect, when the position sensing means functions by electrical signals generated in the stylus by voltages due to ultrasonic pulses applied alternately at two edges of the sheet. The stylus then has a wire to carry signals to part of the position-sensing means. Stylus position indicators of this type are available from Siemens AG, 8000, Munich, Germany.

In another form where a single member is used the stylus generator low-energy sparks and the stylus position is determined by hypersonic ranging. Such equipment can be purchased from Saence Accessories Corporation, Southport, Conn., U.S.A.

According to a third aspect of the present invention there is provided apparatus for use in determiningg the integral or average value between predetermined limits of a function from a graph of the function between the limits, including a first member in the form of a sheet of material over which, in operation, a graph of a function represented on flexible material is placed, a second member parallel and adjacent to, but not in contact with a surface of the second member, the members being of electrically conductive material and the sheet being of such material and/or so mounted that it is able to deform temporarily and make contact with the said surface over a relatively small area when pressed towards the surface by stylus means used to follow the curve of the graph, means for applying a voltage across one of the members, and an integrating circuit coupled to the other member, the apparatus being such that if the axis of the independent variable of the graph is placed in a predetermined position, the two members can be so pressed into contact in following the curve that sample signals representing the dependent variable of the graph pass to the integrating circuit, and the said other member being so shaped and/or so coupled to the integrating circuit that sample signals pass to the integrating circuit at increments of the independent variable which are equal to one another.

Such an arrangement is very inexpensive in relation to the previously mentioned known forms of apparatus.

Preferably the said one member is made of material which is sufficiently resistive to provide a convenient potential gradient in that member to allow the said sample signals in the form of currents to be distinguished clearly between values of the dependent variable of different magnitudes.

For example the said one member may for example be made of carbon loaded plastic or glass cloth covered with silicone rubber.

It is also preferable that the said one member has a rectangular surface with electrodes of high conductivity material along opposite edges, the means for applying voltage being coupled to the electrodes with the result that in operation equipotentials exist in the said one member substantially parallel to the electrodes.

Where the said one member is the first member, the second member may comprise a plurality of parallel spaced conductors having surfaces which together form the said surface of the second member, the conductors being connected together and coupled to the integrating means. If the axis of the independent variable is at right angles to these conductors, sample currents are automatically taken in following the curve at equal increments of the independent variable.

Instead of using a single group of parallel conductors three or more such groups may be used with the conductors of the groups parallel, the conductors in each group being connected to one another. The conductors of the groups are then so interleaved that in using the stylus to trace out a curve with the independent variable continually increasing, or continually decreasing, unless remaining constant, a sequence of contacting the conductors with the first member takes place in which a conductor from each other group is contacted before a conductor in the same group as the conductor originally contacted is contacted, and so on cyclically. Logic circuits are provided to give an alarm and/or cancel the output signal of the apparatus if this sequence is departed from. In this way any reversal of the direction of tracing the curve which would give rise to errors is detected. In addition a single conductor along or near the independent-variable axis may be provided and connected to the logic circuit to allow curve tracing to start at any point along this axis without the alarm being given or cancellation of the output signal occurring.

Where a group or groups of conductors, as mentioned above, are used it is necessary to trace the curve at a uniform rate unless a gate circuit is provided between the group or groups of conductors and the integrating means, the gate circuit being constructed to be opened for a predetermined interval each time a conductor is first contacted. The necessity for tracing the curve at a uniform rate is avoided since the duration of contact of the members no longer affects the magnitude of each charge passed to the integrating means.

In another arrangement the first and second members may both be of continuous resistive material. For example the said other member may Teledeltos paper, or a palladium-silver cermet, that is a palladium-silver/glass printed and fired on an alumina substrate. Switching means are then provided to couple the means for applying voltage to either member in directions mutually at right angles, and one member is coupled to an increment detector circuit. Voltage is applied to the said other member unless a signal has been received from the increment detector circuit, when voltage is applied for a predetermined interval to the said one member. The switching means are also constructed to disconnect the integrating means from the said other member temporarily, when voltage is applied thereto. If a graph to be integrated is placed on the said one member with the axis of the independent variable parallel to the direction in which voltage is applied to the said other member, and the curve is traced, then the voltage from the said other member is picked up by the said one member and passed to the increment-detector circuit. When this voltage has increased by a predetermined increment corresponding to a predetermined increment of the independent variable, a signal is passed to the switching means, and voltage is now applied to the said one member for the predetermined interval, picked up by the said other member and passed to the integrating means. At the end of the predetermined interval the next increment is detected and the cycle is repeated.

Apparatus according to the invention may also be adapted for use in determining the average value of a function by the inclusion of averaging means for, in effect, dividing the output of the integrating means by the interval of the independent variable over which the average is to be taken.

The averaging means may include a circuit whose output is a control signal proportional to the distance between a fixed line on the first member and a second line parallel to the first whose position can be adjusted for example by means of a cursor arranged to be movable over the first member, third line normal to the first two being parallel to the direction in which voltage is to be applied to the said one member so that the independent variable axis of the graph may be placed parallel to the third line, and the distance between the first two lines being made coincident with the interval over which the average is to be taken. The output signal may be a voltage from a potentiometer coupled to such a cursor.

The averaging means may then also include a timing circuit for varying the interval for which the said gate circuit or the said switching means are in the state in which sample currents flow to the integrating means, the variation in the interval being inversely proportional to the control signal.

Figure 2:
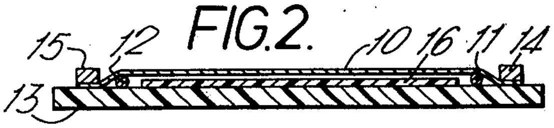
Figure 3:
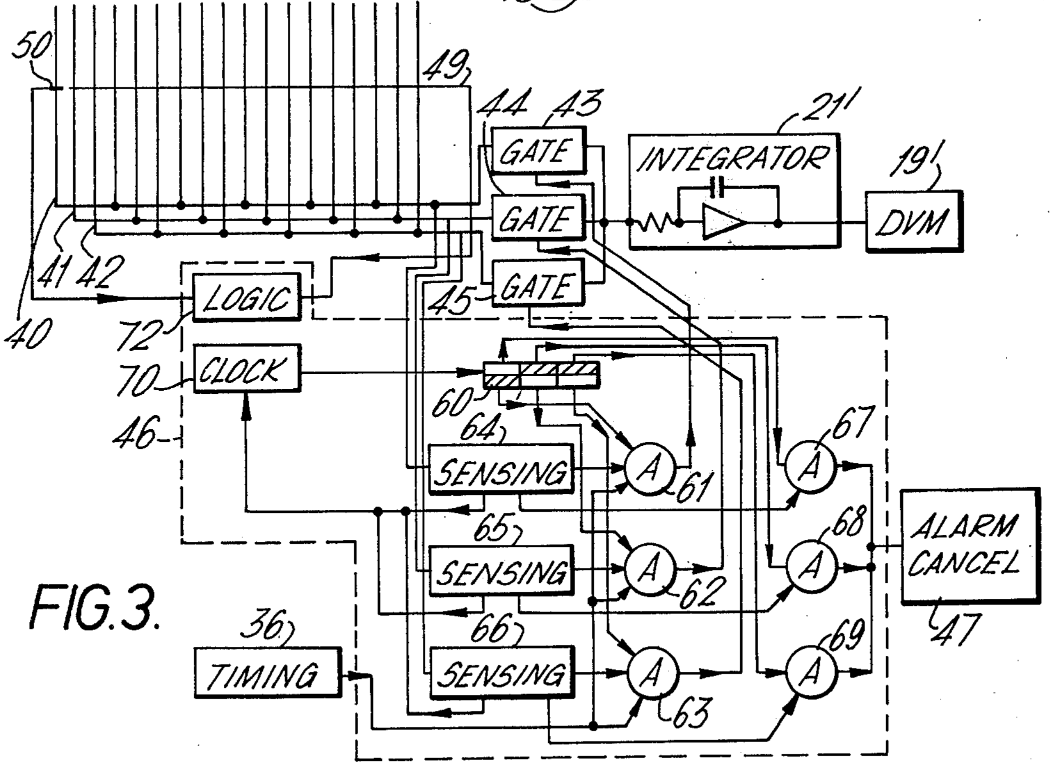
Figure 4:
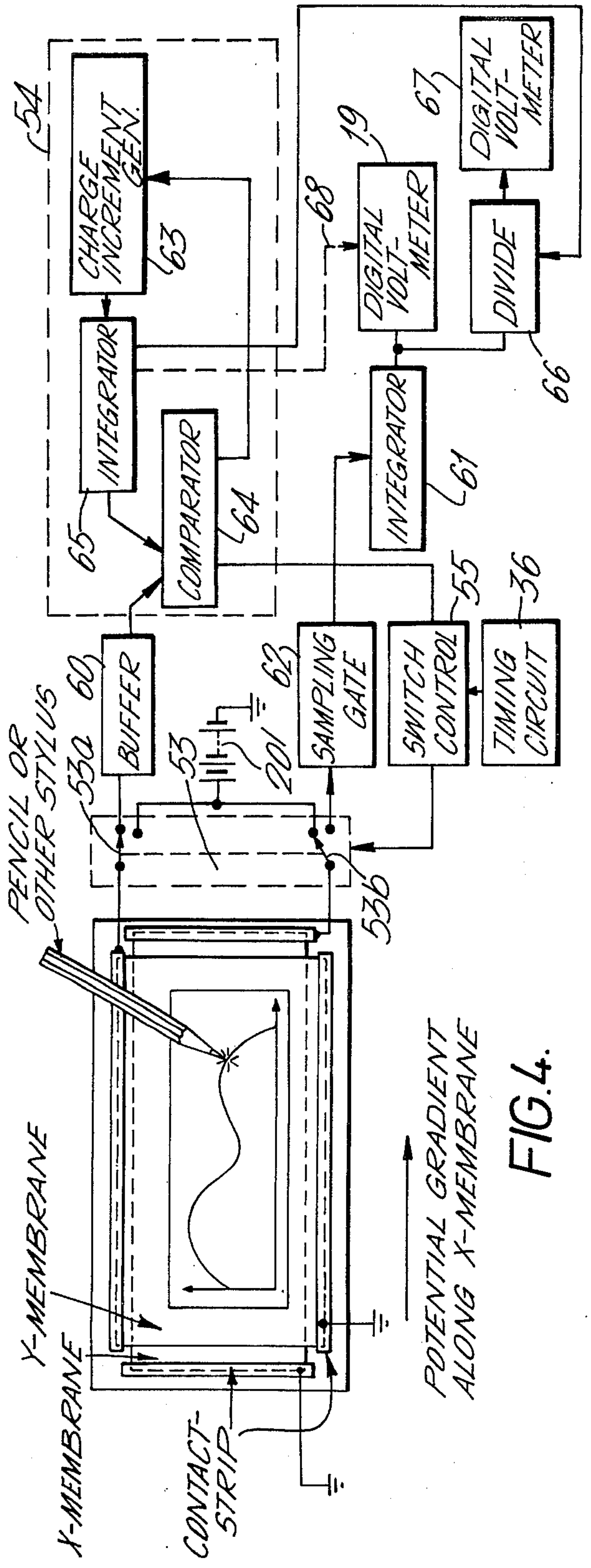
Figure 5:
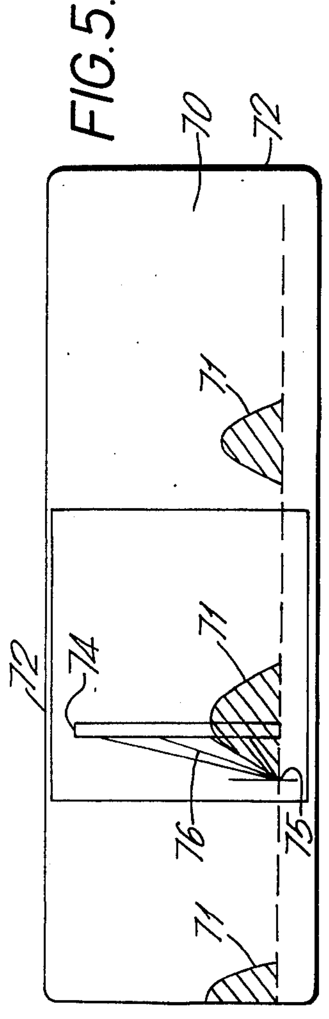
Figure 6:
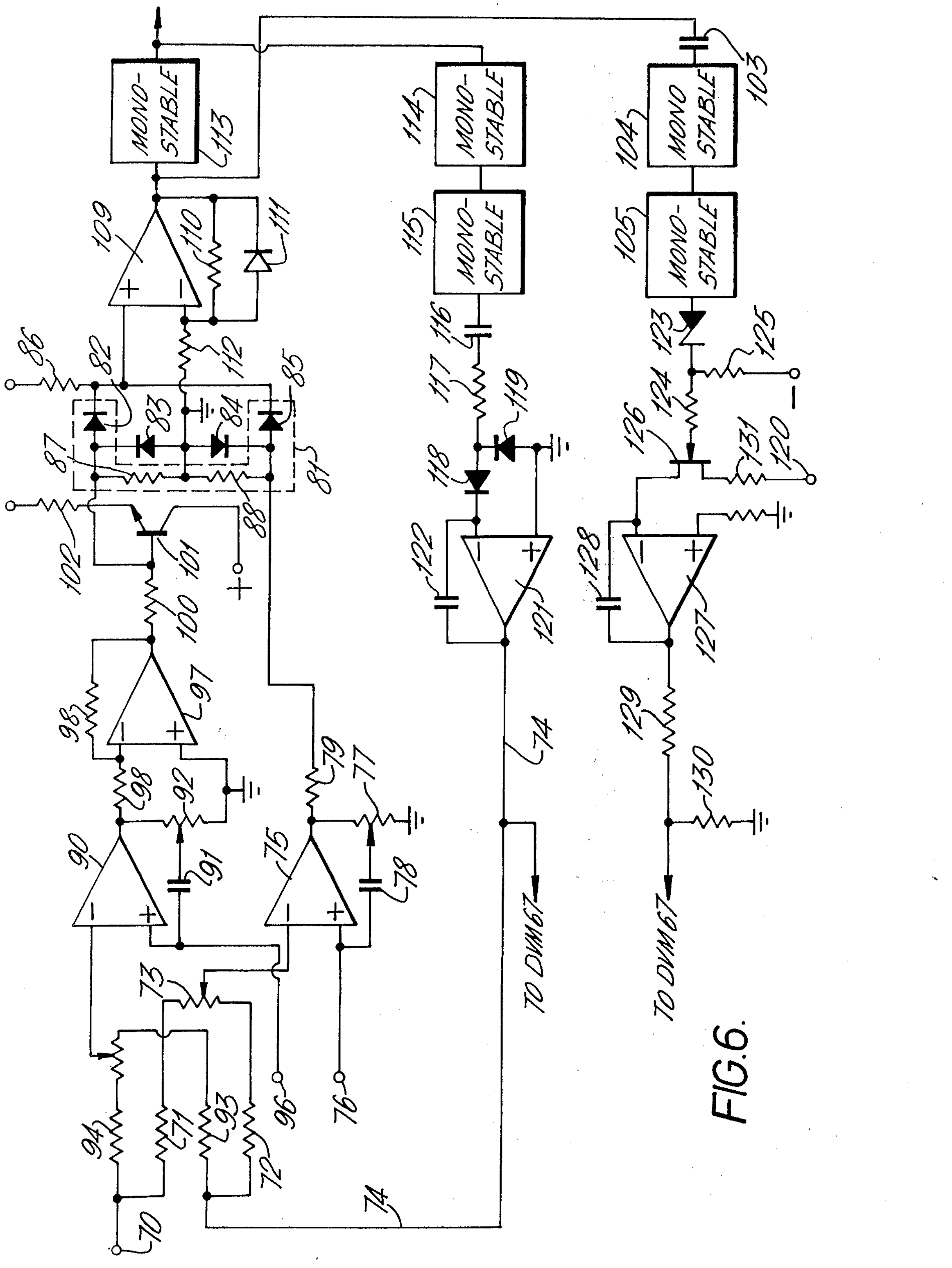
Figure 7:
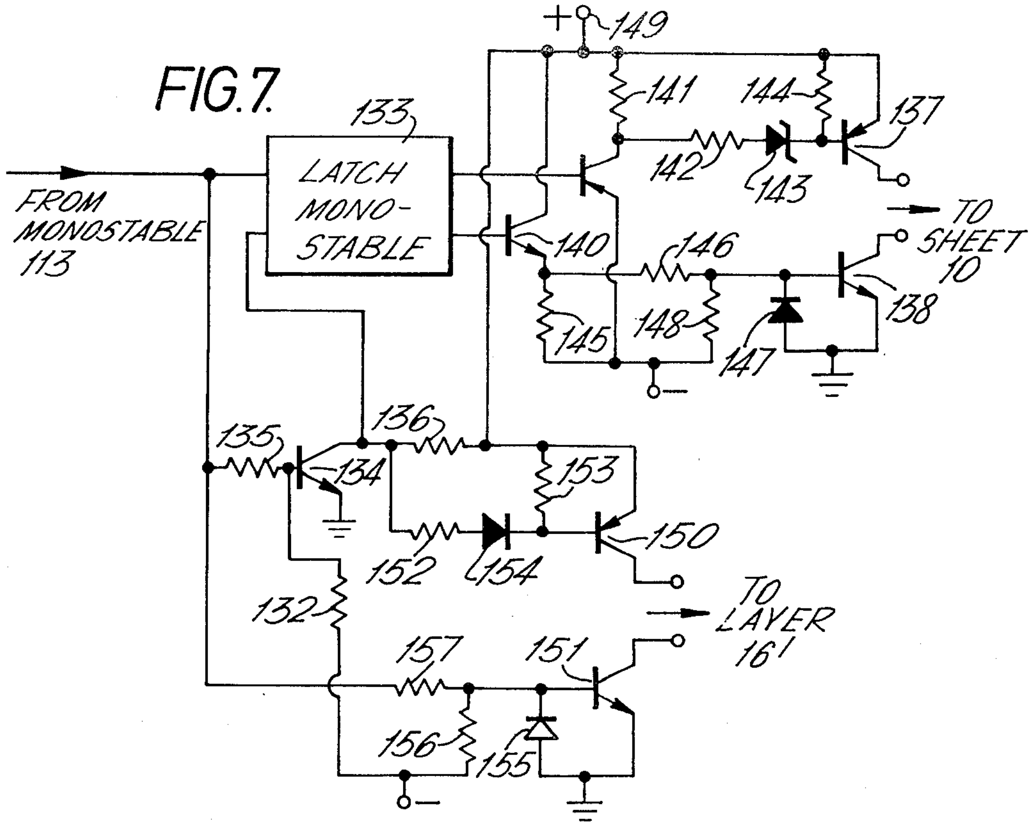
Figure 8:
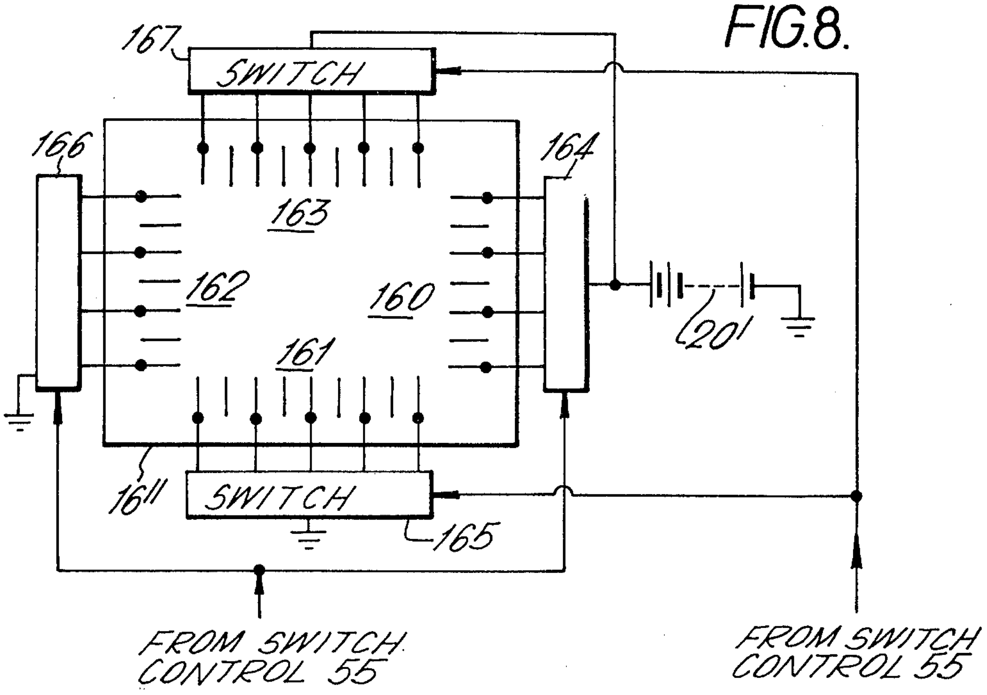

Certain embodiments of the invention will now be described by way of example with reference to the accompanying drawings, in which:

FIG. 1 is a part schematic-part block diagram of one embodiment of the invention, FIG. 2 is a cross-section on the line II — II of part of the embodiment of FIG. 1, FIG. 3 shows an electrode arrangement and current block diagram which can be used instead of part of the embodiment of FIG. 1, FIG. 4 is a part schematic-part block diagram of another embodiment of the invention, FIG. 5 shows a cursor useful in obtaining graph gradients, FIG. 6 is a part circuit part block diagram of a portion of FIG. 4, FIG. 7 is a part circuit part block diagram of a portion of the switching means of FIG. 4, and FIG. 8 is a block diagram of another input tablet which may be used in putting the invention into practice.

In FIGS. 1 and 2 a uniform resilient sheet 10 of resistance material is stretched across to supporting electrodes 11 and 12 mounted on an insulating base 13. The sheet 10 is held in place by two blocks of conducting material 14 and 15. Underneath the sheet but separated therefrom is an insulating layer 16 carrying a plurality of parallel conductors 17 joined to a transverse conductor 18 to form a comb shaped pattern of conductors. The pattern may, for example, be laid down by a printed circuit technique.

A voltage from a centre earthed battery 20 is connected between the electrodes 11 and 12 to cause equipotentials to exist in the sheet parallel to the electrodes, and an integrating circuit 21 is coupled by way of a gate circuit 22 to the conductor 18. A digital indicating voltmeter 19 indicates the output voltage of the circuit 21. The earth for the integrating circuit 21 is the same as at the battery centre.

By way of example, to integrate a graph 23 drawn on a piece of paper 24 between points 25 and 26, the paper 24 is placed on the sheet 10 with the independent-variable axis, e.g. the $x$ axis 27 coincident with a line 28 marked on the sheet 10 and indicating the zero equipotential line in the sheet relative to battery centre. The curve 23 between the points 25 and 26 can then be followed by a stylus which presses the sheet 10 into contact with the layer 16.

If the gate 22 remains open the integrator receives a series of sample currents at constant increments of $x$. The magnitude and sign of these currents depends on the values of the independent variable (the $y$ value) at the points where the conductors 17 are contacted since the voltage of the sheet 10 above or below earth at these points is determined by their distances from the electrodes 11 and 12. The integrating circuit 21 sums the sample currents and provided the curve is traced at a constant rate indicates by its output voltage the integral between the points 25 and 26.

In order to obviate the need for tracing the curve at a constant rate, the gate 22 is preferably constructed to open for a predetermined interval each time the sheet 10 makes contact with one of the conductors 17. Thus each sample current is of a fixed duration regardless of the rate of curve tracing.

When it is required to find the average value of a curve between two points such as the point 25 and a point 29, the integrated output must, in effect be divided by the difference in the value of $x$ at the two points. In the embodiment of FIGS. 1 and 2 this operation is carried out by ensuring that the first point 25 is on a line 31 on the sheet 10 which on extension would pass through one end of a potentiometer 32, and by setting a cursor 33 so that the left-hand edge 34 crosses the curve at the second point 29. The voltage picked off by the potentiometer tap 35 which is in line with the cursor edge 34, depends on the difference between the $x$ co-ordinates of the points 25 and 29. This voltage passes to a timing circuit 36 which controls the duration of the interval for which the gate 22 is opened, shortening the interval as the potentiometer voltage increases. Hence the integrated output from the integrating circuit 21 is inversely proportional to the difference between the $x$ co-ordinates, as required to provide the average value.

The timing circuit includes a resistance-capacitance (R - C) circuit in which the capacitor attempts to charge to an aiming voltage determined by the potentiometer wiper. It may for example include a capacitor in series with a resistor with the voltage between the potentiometer wiper and earth applied the to series combination. A comparator is connected across the capacitor so that when the capacitor voltage reaches a reference voltage applied to the comparator the timing interval is ended. A switch across the capacitor discharges the capacitor when the reference voltage is reached. The gate 22 is opened when charging starts and closed when the reference voltage has been reached. Since the rate of charge is greater with a greater potentiometer voltage, an increase in potentiometer voltage results in a shorter interval, for which the gate 22 opened.

Errors may arise if contact between the sheet 10 and the conductor 17 is caused by the hand of a person tracing the curve resting on the sheet. Other similar unwanted contacts may also occur. For this reason a resistance monitor circuit 38 is connected between the two edges of the sheet 10. When an unwanted contact occurs it is usually over a considerable area and the resistance of the sheet accordingly falls considerably since part of the sheet is shunted by the conductors 17. This drop in resistance is detected by the circuit 38, the reading on the voltmeter 19 is cancelled and an alarm is also given.

In addition, or instead, large area contacts may be avoided by filling the space between the sheet 10 and the conductor 17 with a liquid, or a liquid gel. Transparent oil having molecules of long chain polymers is suitable, as is a thixotropic material. Instead of mechanical separator such as an insulating mesh may be used between the sheet and the conductor. The separator may, in another form, also be fabricated by screen printing a matrix of insulating islands on one of the resistance layers.

The arrangement of FIGS. 1 and 2 functions accurately only if the curve is traced without loss of contact and without reversing the direction of tracing. In order to give an automatic indication of such occurrences, the electrode arrangement and block diagram shown in FIG. 3 may be used. The conductors 17 and 18 of FIG. 1 are replaced by three groups 40, 41 and 42 of conductors, each group being arranged in the shape of a comb, and the combs being arranged interdigitally. The combs 40, 41 and 42 are connected by way of gates 43, 44 and 45, respectively, to an integrator 21' whose output is connected to a voltmeter 19'. A logic circuit 46 is also connected to the combs 40, 41 and 42 and opens the gates 43, 44 and 45 only if contact with the sheet 10 occurs in the order 40, 41, 42, 40 . . . and so on. Should contact occur in any other order the logic circuit 46 passes a signal to a warning circuit 47 which in addition to providing a visual or audible warning cancels the reading on the voltmeter 19'.

Except for the substitution of the three combs for the single comb of FIG. 1 and the different arrangement of gating and integrator circuits, the arrangement of FIG. 3 is the same as that of FIG. 1, so that in operation the curve to be integrated or averaged, is placed on the sheet 10 and traced in the same way. The timing circuit 36 connected to the potentiometer 32 controls duration of the interval for which the gates 43, 44 and 45 are open, in a similar way to the control for the gate 22, according to the position of the cursor 33.

Describing now the logic circuit 46 in more detail, a ring counter 60 having three stages has two groups of three outputs, each stage having two outputs one in each group. In a predetermined conduction state, one output of one stage in a first of the groups provides an enabling signal and two outputs one from each of the other two stages provide enabling signals in the second group. As the conduction state circulates round the counter the next output in the first group provides an enabling signal and that stage which previously provided the enabling signal in the first group now provides one of the two enabling signals on the second group; and so on.

The three outputs of the first group are connected to AND gates 61, 62 and 63, respectively; and these gates are also connected to sensing circuits 64, 65 and 66, respectively. A contact made on the comb 40 is sensed by the circuit 64 and similarly contacts on the combs 41 and 42 are sensed by the circuits 65 and 66. The timing circuit 36 is connected to all three AND gates 61, 62 and 63 and provides an enabling signal before, and for a predetermined time (as determined by the setting of the cursor 33 and the potentiometer 32) after each of these gates is initially enabled.

The three outputs of the counter 60 in the second group are connected to AND gates 67, 68 and 69 respectively, which are also connected to receive enabling signals from the sensing circuits 64, 65 and 66, respectively.

In operation, assuming the ring counter 60 is set to enable the AND gate 61, as soon as the comb 40 is contacted the sensing circuit 64 also enables the gate 61 which opens, opening the gate 43 for the predetermined interval. The sensing circuit 64 also passes a signal to a clock circuit 70 which after an interval passes a clock pulse to advance the counter 60. This interval is greater than the maximum interval for which the gates 43, 44 and 45 remain open.

Since the counter is now advanced, if the next contact is made with the comb 41 the gate 62 opens, opening the gate 44; but if, for example, the comb 40 is contacted again, the counter 60 and the sensing circuit 64 will enable and open the gate 67 activating the warning circuit 47. Similarly contact with the comb 42 opens the gate 69.

Since in finding the integral of part of the curve, the curve tracing may be started at any position along the $x$ axis, a further electrode 49 is provided and connected to the logic circuit 46. The electrode 49 is positioned under the line 28 on the sheet 10. The electrode 49 is coupled to an additional circuit 72 in the logic 46 to allow the contact sequence of the combs 40, 41 and 42 to be entered at any point provided tracing is started on the $x$ axis. The circuit 72 is not described in detail but in one example it takes the form of means for setting all stages of the counter to the state in which enabling signals are applied to all the AND gates 61, 62 and 63, and means for setting the appropriate stage of the counter to enable the next AND gate in the sequence 61, 62, 63, 61 and so on when one of these gates is opened. A similar electrode 50 is provided for use when averaging only and for this reason is situated at the extreme left of the sheet 10. In averaging, unless the electrode 50 is first contacted by the sheet 10, the warning circuit 47 operates.

In operation of the arrangement of FIG. 3 to determine an average value the following sequence occurs:

a. the potentiometer 32 is set manually, b. tracing is started, c. the electrode 50 is contacted, d. contact on one of combs 40 or 41 or 42 is sensed (warning given and cancellation of output occurs if the electrode 50 has not previously been contacted), e. one of the gates 43, 44 and 45 is opened depending on which comb was contacted, and a sample current flows in the integrator 21′, f. contact on the next comb in the sequence is detected (warning and cancellation occurs if the order of the contact sensed is not on the next comb in the sequence; and also if there is loss of contact), g. one of the gates 43, 44 and 45 is opened depending on which comb was contacted and a sample current flows in the integrator 21′, h. repeat (f) and (g) alternately until, i. contact is sensed with the electrode 49, when the circuit 47 is inhibited — at this point the curve may be traced along the $x$ axis for any distance, j. when tracing the curve begins to rise again from zero, contact with the electrode 49 is sensed and the circuit 47 is activated, k. repeat (g), (h), (i) and (j) until end of tracing.

In order to calibrate the apparatus, the stylus may be used to trace along the $x$ axis 28 and the integrator output is then set to zero. To provide full scale calibration the stylus is used to trace along the top of the sheet 10 parallel to the $x$ axis and the integrator output is set to some predetermined value.

In another embodiment of the invention the layer 16 with its printed conductors is replaced by a continuously conducting layer 16′ with a similar resistive characteristic as the sheet 10. When curve tracing begins contact 53$a$ of a switch 53 applies the voltage of the battery 20′ across the layer 16′. Changes in this voltage during tracing sensed by contact with the sheet 10 are passed, by way of a buffer circuit 60, to an increment detector 54 which, when the increment reaches a certain size, signals a switch control circuit 55 to change the position of the switch 53. As a result the battery 20′ is connected across the sheet 10 by means of contacts 53$a$ and 53$b$ and the integrator circuit 61 is connected to the layer 16′ by means of contacts 53$b$. A sample current now flows by way of the layer 16′ into an integrator 61 for an interval determined by a sampling gate 62 controlled by the switch control circuit 55. At the end of this interval the contacts 53$a$ and 53$b$ revert to their original positions and the sampling gate closes. The timing circuit 36 is controlled from the tap 35 of the potentiometer 32 in the same way as in FIG. 1.

The increment detector 54 includes a change step generator 63 which receives an increment each time a comparator 64 indicates that its input signals are equal. The step generated is passed to an integrator 65 which provides one comparator input. Hence after each $x$ increment has been detected the integrator 65 receives a step of charge and steps its output applied to the comparator 64. When the $x$ value rises to equal the output of the integrator 65, the comparator opens operating the switch control circuit 55 and causing another step to be applied to the integrator 65.

The arrangement shown in FIG. 4 can only be used for integrating and summing graphs without negative $y$ values. However, this limitation can be overcome by connecting the positive and negative terminals of a centre tapped battery (replacing the battery 20′) to the movable contacts of first and second two position switches, respectively. One fixed contact of one switch is then connected to one end of the sheet 10 while the corresponding fixed contact of the other switch is connected to the other end of the sheet 10. Similarly the other two fixed contacts of the switches are connected to respective ends of the layer 16′. The earth contacts are removed from the sheet 10 and the layer 16′ but the remaining circuits are earthed normally.

In order to reduce costs, the potentiometer 32 may be replaced by a wiper adapted to move in the direction of the $x$ axis along the sheet 16. The voltage obtained in this way is used as the aiming voltage for the R - C circuit in the timing circuit 36. However, since the aiming voltage is required when voltage is applied to the sheet 10 not the layer 16′, means are provided to hold the voltage picked up by the wiper. For example this voltage may be held by a larger capacitor which is connected to the wiper by way of a field-effect transistor so that it can be disconnected when voltage is removed from the layer 16′.

Alternatively a strip of the material of the layer 16′ preferably alongside the layer may be fitted with a wiper and used as a potentiometer.

In this way sample currents are taken by equal increments of $x$ as the curve is traced out.

Preferably the size of the increment at which the switch control 55 is operated is made proportional to the voltage applied across the sheet 16′, since then the number of samples per unit length along the $x$ axis always remains constant.

The arrangement of FIG. 4 is inherently insensitive to reverse movements in the $x$ direction as sampling does not continue until the reverse movement has been corrected.

Any non-uniformities in the local surface resistivity of the layer 16' can be greatly reduced if a printed circuit backing plate having parallel conductors in the *y* direction is provided. This plate is energised from a low impedance resistor network so that equipotentials of the correct value exist in the layer along the parallel conductors.

For accuracy, the voltage applied to the sheet 10, and in the arrangement of FIG. 4 to the layer 16' should be stable. However the requirements of voltage stability can be relaxed if the voltage applied to the electrode 11 relative to earth is used as the "aiming voltage" to which the resistance-capacitance circuit in the timing circuit 36 attempts to charge. With this arrangement by virtue of the inverse relationship already described in connection with the averaging procedure, a considerable degree of automatic compensation will occur against changes in the voltage applied to the electrode 11.

To provide compensation in the voltage relative to earth applied to the electrode 12 an operational amplifier can be used instead of the source 20. This amplifier is connected to supply the voltage at the electrode 11 as an inverted but equal voltage to the electrode 12. Thus the voltage at the electrode 12 follows that at the electrode 11.

As shown in FIG. 1 where the potentiometer 32 is used, if the left hand end is connected to earth and the right hand end is held at the voltage of the electrode 11, the open interval for the gate is then inversely proportional both to this voltage and the setting of the potentiometer tap 35 and as a result better accuracy is achieved.

Perhaps a better way of automatically determining the average value is to take the output of the integrator 65, which it will be appreciated nearly always differs from the *x* value by less than the x-increment, and use it to divide the output from the integrator 61. A division circuit 66 is shown, connected to a further digital voltmeter 67 indicating average value, for this purpose. Instead if the digital voltmeter 19 is of the type which requires a reference voltage and whose output is inversely proportional to the reference voltage, then the output of the integrator 65 can be used as the reference voltage as indicated by the line 68, and the voltmeter 19 will indicate average value. Where such arrangements are used the potentiometer 32 or any analogous component is, of course, omitted.

A useful accessory is shown in FIG. 5 where a section of continuous chart recording 70 with three similar cyclically recurring curves 71 is shown over the area 72 of the sheet 10. A transparent cursor 73 having a slot 74 is placed over the centre curve 71 with an origin marked on the cursor at 75 on the point of initial rise of the curve 71. If a stylus is now used to press the sheet 10 where the curve 71 crosses the slot a *y* value is indicated by the voltmeter 19. Since the distance from the origin 75 to the slot 75 along the *x* axis is known, the voltmeter reading is proportional to the gradient, or acceleration of the curve 71 and may be used as an indication of these quantities. A fan of lines 76 is engraved on the cursor to allow the scope of the initial acceleration to be assessed by eye.

In some applications, for example where the average of a value of a curve on a recorder chart is to be found, it is advantageous to have the sheet 10 and the layer 16' relatively short in the direction of the dependent variable axis and long in the direction of the independent variable axis, usually the time axis. Thus the voltage applied to the layer 16' is preferably larger than that applied to the sheet 10 and not the same as shown in FIG. 4.

The block diagram of FIG. 4 will now be described in more detail with reference to the circuit diagrams of FIGS. 6 and 7. Signals representing *x* co-ordinates reach the comparator 64 by way of a conventional buffer amplifier 60 which is not described further, except to mention that in addition to impedance adjustment the buffer amplifier and a similar such amplifier (not shown) for the *y* signals make a level adjustment necessary because the working areas of the sheet 10 and the layer 16' are not their extreme edges.

The *x* signals then pass to a terminal 70 (see FIG. 6) and then to a resistive subtraction network comprising two 100 Kohms resistors 71 and 72 and a 100 ohm potentiometer 73. The substraction network also receives the integrated *x* signal from the integrator 65 by way of a connection 74. The tap terminal of the potentiometer 73 is connected to a type 307 operational amplifier 75 which also receives a reference voltage applied at a terminal 76. The operational amplifier 75 is connected as a comparator circuit by means of a 20 Kohm potentiometer 77 and a 220 pF capacitor 78. Thus when an *x* increment (that is the difference between the output of the integrator 65 appearing by way of the connection 74 and the signal applied by way of the buffer amplifier 60) is equal to the reference voltage applied at the terminal 76, the comparator circuit applies an enabling signal, by way of a 1 Kohm resistor 79 to an AND gate 81 comprising diodes 82 and 85 and resistors 86, 87 and 88. Diodes 83 and 84 are for signal limiting.

The *x* signals and the output of the the integrator 65 are also connected by way of a subtraction circuit to the input of an operational amplifier 90 also connected as a comparator circuit by means of a 220 pF capacitor 91 and a 20 Kohm potentiometer 92. The subtraction circuit for the input of the amplifier 90 comprises two 100 Kohm resistors 93 and 94 and a potentiometer 95. A reference voltage is applied to the amplifier 90 from a terminal 96 and this reference voltage is such that should the *x* increment reach a value higher than that which should have caused the amplifier 75 to enable the AND gate 81, for example because of loss of stylus contact, then the amplifier 90 will provide an output signal. An inverter comprising a type 741 operational amplifier 97 and a 4.7 Kohm shunt resistor 98 is coupled by way of a 1 Kohm resistor 99 to the output of the amplifier 90 and the output of the amplifier 97 is coupled by way of a further 1 Kohm resistor 100 to the AND gate 81. Hence this gate opens only if the *x* increment equals the reference voltage applied at the terminals 76 but has not reached that applied at a terminal 96. These reference voltages are normally of the order of +10 and +20 millivolts, respectively. The amplifier 97 is also coupled to the base of a BC182 type transistor 101 whose 330 ohm emitter load resistor 102 is coupled to means (not shown) for giving an audible warning that overshoot of the *x* signal has occurred.

A Schmitt trigger circuit comprising a type 741 operational amplifier 109 and a 68 Kohm resistor 110 in parallel with a diode 111 is connected by way of a 1 Kohm resistor 112 to the AND gate 81.

When the AND gate 81 is open, the Schmitt circuit triggers a monostable circuit 113. An integrated circuit type NE555 obtainable from the Sigmatics Corporation, Sunnyvale, Calif., U.S.A. is suitable for this monostable circuit. The output of the monostable circuit 113 provides a 3 millisecond pulse whose leading edge causes the switching circuit 53 to connect the battery 20' across the sheet 10 instead of the layer 16', and whose trailing edge, after a 0.1 millisecond delay provided by a monostable circuit 114, causes a 1 millisecond pulse to be produced by a monostable circuit 115 and passed to the integrator 65 formed by a type 40J operational amplifier 121 made by Analogue Devices Ltd. connected as an integrator using a 1$\mu$F polystyrene capacitor 122. This integrator receives its input signals by way of the 330 pF capacitor 116, a 10 Kohm resistor 117, a type CA3039 series diode 118 and a type 1S922 shunt diode 119. One output of the amplifier 121 is coupled back to the subtraction network of the comparator 64 by way of the connection 74 but another such output is connected by way of a conventional division circuit to act as the reference voltage used in averaging in the voltmeter 19.

When the switch 53 has been operated, sampling of the $y$ voltage can take place and the pulse from the trigger circuit 109 passes by way of a 1,000 pF capacitor 103 and a monostable 104 providing a 1 millisecond delay to a monostable 105 which provides a 1 millisecond pulse. In this way sampling takes place 1 millisecond after the switch 53 has operated and lasts for 1 millisecond. This sampling has ceased for 1 millisecond before the monostable circuit 113 causes the switch 53 to revert to its original state. The monostable circuits 104 and 105 can, as before, be type NE555 integrated circuits. The pulse from the monostable 105 circuit passes by way of a 5.6 volt zener diode 123 and series and shunt resistors 124 and 125 of 1 Kohms, respectively, to a type BSV81 field effect transistor 126 made by Mullard Ltd. forming the sampling gate 62. A 10 Kohm resistor 131 is connected between the drain terminal of the transistor and a terminal 120 which receives the $y$ signals via the switching circuit 53. The integrator 61 includes a type 40J operational amplifier 127 with a 4.7 $\mu$F polystyrene shunt capacitor 128 and a 10 Kohm resistor 129 connected between the positive input and earth. The output of the integrator passes by way of series and shunt resistors 129 and 130, each of 10 Kohms, to the digital voltmeter 19. The conventional type of switched resistor network (not shown) may be included between the integrator 61 and the digital voltmeter in order to allow different voltage ranges to be measured.

The switch circuit 53 is shown in FIG. 7 and includes a bistable circuit 133 which may be a type CD4011 integrated circuit made by R.C.A. connected to the monostable circuit 113 of FIG. 6, and an inverter formed by a type BC184 transistor 134, two 5.6 Kohm resistors 135 and 136 and a 20 Kohm resistor 132.

When the $y$ signal is being sensed current is passed through the sheet 10 which is connected between two drive resistors 137 and 138 which are of types 2N2905 and 2N1507, respectively. When the Schmitt trigger circuit 109 fires an output signal from the bistable circuit 133 immediately switches on the resistors 137 and 138. Thus the sheet 10 is connected between the battery 20' connected to a terminal 149 and earth at the emitter of the transistor 136. The signals of the transistor 137 and 138 are passed by way of a type 212 transistor 139 and type 184 transistor 140. The transistor 139 has a 12 Kohm emitter load resistor 141 and passes its output signal through a 1.2 Kohm resistor 142 and a 4.7 volt zener diode 43 to the base of the transistor 137 which has a 1 Kohm bias resistor 144. The transistor 140 also has a 12 Kohm emitter load resistor 145 and passes its output signal through a 1.2 Kohm resistor 146 to the base of the transistor 138. This transistor base is connected to earth by way of a diode 147 and to a negative supply voltage through a 39 Kohm resistor 148.

When the trailing edge of the pulse from the monostable circuit 113 is received it is passed by way of the inverting transistor 134 to the bistable circuit 133 which reverts to its original state switching off the transistors 137 and 138. At the same time the removal of the pulse at output of the monostable circuit 113 allows transistors 150 and 151 to revert to their conducting state in which they connect the layer 16' between the battery 20' and earth. The transistor 150 is of type 2N2905 as is the transistor 137 and has a similar input circuit consisting of a 1.2 Kohm resistor 152, a 1 Kohm resistor 153 and a zener diode 154. The transistor 151 which is type 2N1507 has a similar input circuit to the transistor 138 and consists of a diode 155, a 39 Kohm resistor 156 and a 1.2 Kohm resistor 157.

Where an area which is formed by a closed loop is to be measured, this can be carried out by regarding the loop as being made up of two lines which have increasing values of $x$ only, measuring the area under each line and subtracting one of these areas from the other.

The above described apparatus of FIGS. 4, 6 and 7 can be modified to measure closed-loop areas by the inclusion of a further comparator similar to the comparator 64 but sensitive to negative increments of $x$. The further comparator which includes overshoot warning, operates switch means to reverse the polarity applied to the sheet 10 ensuring that the integrator 61 receives negative increments. The switch means also reverses the polarity of increments applied to the integrator 65. Hence when a closed loop is traced operation is as previously described until tracing in the direction of increasing $x$ ceases and the stylus is made to start traversing in the opposite direction. The further comparator now operates and the output signals of the integrators 61 and 65 decrease until the curve has been completely traced when the output signal of the integrator 61 is proportional to the area of the closed loop. Alternatively a further integrator which receives only negative increments of charge may be provided for the further comparator.

In another arrangement only one comparator 64 and integrator 65 are included but a manual switch is provided to reverse the polarity applied to the sheet when traverse along the upper of the above mentioned two lines is complete and before the lower line is traversed also in the direction of increasing $x$.

A further advantageous modification of the apparatus of FIGS. 4, 6 and 7 is the provision of an a.c. source (not shown) coupled in series with the sheet 10 and the layer 16' and means (not shown) for measuring the a.c. current from the source. This current gives an indication of the contact resistance between the sheet and the layer, and should this resistance be too high, indicating perhaps an unintentional contact where the stylus is not pressed sufficiently, then a warning is given and/or the circuits of FIG. 4 are discabled.

In the arrangement of FIG. 4 the sheet 10 must be flexible and homogeneous in order to ensure linearity of resistance. Such sheets are difficult to manufacture but the problem can be avoided by the arrangement of FIG. 8 where a layer 16″ which is rigid is used. It is a comparatively simple matter to produce a rigid layer which is homogeneous and does not have to withstand the wear and constantly occurring deformation caused by the stylus. Voltages are applied across the layer 16″ alternately in directions mutually at right angles from rows 160 to 163 of "dashes" of conducting material printed on the layer 16. The layer 10 can now be a strong conducting sheet without a requirement for good linearity since it is used only to "pick off" voltages from the layer 16″. (The sectional view of FIG. 2 applies with 16 replaced by 16″.) Thus layer 10 is connected alternately to the buffer 60 and to the sampling gate 62 when *x* increments and *y* samples are required, respectively. Alternate dashes in the rows 160 to 163 are connected to switching circuits 164 to 167, respectively. Each of these switching circuits either connects all the dashes connected to it to one another and the battery 20′ or earth, or it isolates those dashes, in dependence upon signals received from the switch control circuit 55.

In operation therefore the switching circuits 164 and 166 operate when *x* increments are to be detected to connect dashes in the row 160 to the battery 20′, and dashes in the row 162 to earth. Similarly when *y* samples are required the switching circuits 165 and 167 operate to connect dashes in the row 163 to the battery 20′, and dashes in the row 161 to earth.

Each switching circuit may include one or more field-effect transistors with a plurality of source electrodes and a common gate electrode, which when correctly biassed, in effect connects the sources and the drain electrodes together. A suitable spacing for the dashes is one centimetre although of course other larger or smaller spacings may be appropriate depending on materials used for the layer 16″ and the voltages applied. Dashes are used to improve the distribution of equipotentials in the layer 16″ over the distribution which would be obtained by spots. While the arrangement shown leads to a more simple interconnection all dashes may be connected to the switching circuits if desired.

Some aspects of one of the graphical input devices of this specification are described in more detail in U.K. specification No. 1,310,683.

I claim:

1. Apparatus for use in determining the integral between predetermined limits of a function from a graph of the function between the limits, including a first member in the form of a sheet of material over which, in operation, a graph of a function represented on flexible material is placed, a second member having a surface parallel and adjacent to, but not in contact with the first member, the members being of electrically conductive material and the sheet being of such material and so mounted that is able to deform temporarily and make contact with the said surface over a relatively small area when pressed towards the surface by stylus means used to follow the curve of the graph, means for applying a voltage across one of the members, and an integrating circuit coupled to the other member, the apparatus being such that if the axis of the independent variable of the graph is placed in a predetermined position, the two members can be so pressed into contact in following the curve that sample signals representing the dependent variable of the graph pass to the integrating circuit, and the said other member being so coupled to the integrating circuit that sample signals pass to the integrating circuit at increments of the independent variable which are equal to one another.

2. Apparatus according to claim 1 wherein the said one member is made of material which is sufficiently resistive to provide a convenient potential gradient in that member to allow the said sample signals in the form of currents to be distinguished clearly between values of the dependent variable of different magnitudes.

3. Apparatus according to claim 1 wherein the said one member is made of carbon loaded plastics material, or glass cloth covered with silicone rubber.

4. Apparatus according to claim 1 wherein the said one member has a rectangular surface with electrodes of high conductivity material along opposite edges, the means for applying voltage being coupled to the electrodes with the result that in operation equipotentials exist in the said one member substantially parallel to the electrodes.

5. Apparatus according to claim 1 wherein both the first and second members are of continuous resistive material.

6. Apparatus according to claim 5 wherein the said other member is chosen from the group comprising Teledeltos paper, and a palladium-silver cement.

7. Apparatus according to claim 5, including switching means for coupling the means for applying voltage to the said other member except when caused by a control signal to couple the means for applying voltage to the said one member, voltage being applied, in operation, in directions mutually at right angles in the two members, an increment detector for providing a control signal for the switching means each time the signal applied to the increment detector changes by more than a first predetermined amount, the switching means also coupling the increment detector to the said one member when voltage is applied to said other member and coupling the integrating means to the said other member only when voltage is applied to the said one member.

8. Apparatus according to claim 1 including means for dividing the output signal of the integrating means by the interval of the independent variable which is tranversed by the stylus.

9. Apparatus according to claim 1, including means for preventing the generation of a control signal and for providing an alarm when the signal applied to the increment detector changes by more than a second predetermined amount of larger magnitude than the first predetermined amount.

10. Apparatus according to claim 9 wherein the increment detector includes a comparator with one input coupled to the switching means and another input coupled to a further integrating means, and means for passing an increment to the further integrating means each time the comparator indicates that its input signals have become equal.

11. Apparatus according to claim 10 including a division circuit for dividing the output of the first mentioned integrating means by that of the further integrating means to provide the average value of the graph followed with the stylus.

12. Apparatus according to claim 10 wherein the first mentioned integrating means is coupled to indicating means for indicating the value of the output signal thereof, the indicating means being of a type in which the indication given is proportional to a reference signal, the indicating means being coupled to receive a reference signal which is dependent on the output of the further integrator.

13. Apparatus for use in determining the integral between predetermined limits of a function from a graph of the function between the limits, including a first member in the form of a sheet of material over which, in operation, a graph of a function represented on flexible material is placed, a second member parallel and adjacent to, but not in contact with a surface of the second member, the members being of electrically conductive material and the sheet being of such material and/or so mounted that it is able to deform temporarily and make contact with the said surface over a relatively small area when pressed towards the surface by stylus means used to follow the curve of the graph, means for applying a voltage across one of the members, and an integrating circuit coupled to the other member, the apparatus being such that if the axis of the independent variable of the graph is placed in a predetermined position, the two members can be so pressed into contact in following the curve that sample signals representing the dependent variable of the graph pass to the integrating circuit, and the said other member being so constructed and so coupled to the integrating circuit that sample signals pass to the integrating circuit at increments of the independent variable which are equal to one another.

14. Apparatus according to claim 13 wherein the said one member is the first member, the second member comprises a plurality of parallel spaced conductors having surfaces which together form the said surface of the second member, the conductors being connected together and coupled to the integrating means.

15. Apparatus according to claim 14 including a gate circuit coupled between the conductors and the integrating means, and timing means for opening the gate circuit for a predetermined interval each time a conductor is first contacted by the first member.

16. Apparatus according to claim 15 including averaging means comprising a manually-adjustable reference signal source which can be set to provide a reference signal representative of the interval of the independent variable which is traversed by the stylus, and wherein the timing means is adapted to control the duration of the predetermined interval in accordance with the reference signal.

17. Apparatus according to claim 13 wherein the second member comprises at least three groups of parallel spaced conductors having surfaces which together form the said surface of the second member, the conductors of the groups being coupled to the integrating means and so interleaved that in using the stylus to trace out a curve with the independent variable continually increasing, or continually decreasing, unless remaining constant, a sequence of contacting the conductors with the first member takes place in which a conductor from each other group is contacted before a conductor in the same group as the conductor originally contacted is contacted, and so on cyclically, and wherein the apparatus also includes logic circuits for providing an alarm if the said sequence is departed from.

18. Apparatus according to claim 17 including gate circuits each individually coupled between one of the groups of conductors particular thereto and the integrating means, and timing means for opening a gate circuit for a predetermined interval each time a conductor in the group coupled to that gate circuit is first contacted by the first member.

19. Apparatus according to claim 13 wherein the second member is a rigid resistive sheet having four rows of discrete conducting areas, the rows being arranged to form a rectangle and the means for applying voltage includes four switching means, one associated with, and particular to, each row, each switching means being adapted, on receipt of a switching signal, to connect at least some of the discrete areas of the row associated therewith, the switching means associated with opposite rows being adapted to operate in pairs to apply voltage between connected discrete areas in one pair of opposite rows alternately with connected discrete areas in the other pair of opposite rows.

20. Apparatus according to claim 19 including an increment detector for providing a switching signal for the switching means each time the signal applied to the increment detector changes by a predetermined amount, the switching means being adapted to couple the increment detector to the said other member while voltage is applied between discrete areas in one pair of opposite rows and to apply voltage between discrete areas in the other pair of opposite rows and to couple the integrating circuit to the said other member when the increment detector provides a switching signal.

21. Apparatus according to claim 13, including means for dividing the output signal of the integrating means by the interval of the independent variable which is traversed by the stylus.

* * * * *